(12) United States Patent
Neulight

(10) Patent No.: US 6,829,612 B2
(45) Date of Patent: Dec. 7, 2004

(54) INTERNET-BASED FILM FESTIVAL DIGITAL ENTRY AND BACK OFFICE SERVICES SUITE MODEL

(75) Inventor: Joseph Barry Neulight, Los Angeles, CA (US)

(73) Assignee: Without A. Box, Inc., Westlake Village, CA (US)

( * ) Notice: Subject to any disclaimer, the term of this patent is extended or adjusted under 35 U.S.C. 154(b) by 660 days.

(21) Appl. No.: 09/931,084

(22) Filed: Aug. 15, 2001

(65) Prior Publication Data

US 2002/0035481 A1 Mar. 21, 2002

Related U.S. Application Data

(60) Provisional application No. 60/225,512, filed on Aug. 15, 2000.

(51) Int. Cl.[7] .................................................. G06F 17/30
(52) U.S. Cl. ........................................ 707/10; 707/104.1
(58) Field of Search ................................ 707/10, 104.1

(56) References Cited

U.S. PATENT DOCUMENTS 5,532,833 A * 7/1996 Hong et al. .................... 386/77
6,047,267 A * 4/2000 Owens et al. .................. 705/34
6,496,856 B1 * 12/2002 Kenner et al. ............... 709/218
6,668,377 B1 * 12/2003 Dunn ........................... 725/92

OTHER PUBLICATIONS

Rasala R. "A Model C++ Tree Iterator Class for Binary Search Trees" Technical Symposium on Computer Science Education, ACM Press, 1997, pp. 72–76.*

* cited by examiner

*Primary Examiner*—Jack M. Choules
(74) *Attorney, Agent, or Firm*—Intellectual Property Law Group LLP; Otto O. Lee; Juneko Jackson

(57) ABSTRACT

A new computerized methods using a database system on a global network to administer film festivals. The methods include the filmmakers inputting film information into the database, which information becomes available to selected film festivals. The system preferably handles multiple submissions to different festivals, processes applications, provides simultaneous judging of a competition, and schedules film play times at the festivals.

15 Claims, 13 Drawing Sheets

SET UP A PROJECT

| GET STARTED |
| CONTACTS |

PROJECT
  NATIONALITY
  TITLE
  DIALOGUES
  GENRE & NICHE
  SYNOPSES

| VITAL STATS |

CAST & CREW
  STUDENT FILM
  SPECIALIZED

| PREVIEW |
| EXHIBITION |
| EXPOSURE |
| FINISH UP |

RUNTIME
What is the exact Total Running Time of this project, including all titles and credits?
hrs:min:secs ▪: ▪:▪

COMPLETION
In what year and month was this project completed? (Note: if this is a "work in progress", then please specify the expected date of completion.)
month     year
☐         ☐
work in progress ☐

PRODUCTION BUDGET
Many festivals are interested to know the approximate final budget of your project.
select a currency     total budget
☐                     ☐

SCREENPLAY
Is the screenplay for this project an original work, or an adaptation?
▪ original   ▪ adaptation
Is the screenplay available to festivals?
▪ yes ▪ no submit   skip   back                                   leave

FIG. 12

INTERNET-BASED FILM FESTIVAL DIGITAL ENTRY AND BACK OFFICE SERVICES SUITE MODEL

This patent application claims the benefit of an earlier filed U.S. provisional patent application dated Aug. 15, 2000, Ser. No. 60/225,512.

BACKGROUND

This invention relates to a computer system, and more particularly, to a computerized business system for the administration and processing of international film festival submissions.

Currently, databases exist for listing basic film festival information. Each festival lists on its database the location, activities, and dates and times of events, and film selection criteria. However, it is primarily informational based and does not provide applicants a method or means of either submitting information and/or an entry using a computer-based, pre-programmed entry form online. This lack of an efficient database forces each filmmaker to research every festival individually via telephonic communication, fax, or mail system. Previously, the filmmaker had to submit a separate request to each festival to get the respective phone numbers or addresses. Once the filmmaker submitted the request, he had to wait for each of the festivals to send him back an informational pamphlet. Upon receipt of each festival's pamphlet, the filmmaker must read through all them separately, checking for each festival's pertinent information such as location, activities, dates and times of events, rules, regulations, and qualifying criteria. Once the filmmaker decides where he/she wants to make a submission, he/she must prepare a customized package for each festival. This package contains: the festival's entry form; a press kit; a copy of the film on VHS videocassette or other acceptable format; and festival entry fees, where applicable. The filmmaker must then take the packages to the post office and mail them out individually. These packages frequently weigh more than one pound. Currently, there are approximately one thousand film festivals each year. As such, a filmmaker must undergo this same procedure each time, having to complete the same information but in various formats for submission to each festival where he/she wants his film considered.

There currently lacks of a more efficient and cost-effective way for a filmmaker to submit his package which typically includes a copy of the videocassette on VHS, a press kit, an entry form, and entry fees. Hence, a filmmaker needs a computerized, more efficient way to submit his applications and similar attachments to the various film festivals. There also lacks of a more efficient and cost-effective way for a film festival to receive and administer these packages. For example, some of the more obvious problems are the following:

Virtually all the festivals display their informational databases in different formats. This makes it very difficult for a filmmaker to transfer his similar information between various databases.

After festival coordinators unpack and sort the many packages, the VHS preview cassettes must be sorted into groups and tabulated, and then pass from judge to judge in a linear fashion for review. Linear meaning that after each judge views and rates the videocassette, he passes it on to the next judge. Currently, no two judges can simultaneously watch and rate these videocassettes from different locations. Each judge must wait for the previous judge to complete his/her evaluation before the latter judge may view the videocassette. As such, the review process for these videocassettes is time-consuming.

After all the judges have evaluated the videocassettes, festival coordinators manually collect the results and sort them according to their respective ratings. Judges repeat this whole process of re-rating and resorting each videocassette until they choose the finalists. The festival coordinators then notify the accepted and rejected filmmakers via mail or telephone or fax.

The process is very lengthy and time-consuming because the procedure to submit and evaluate videocassettes and thereafter, to notify the filmmakers, is done manually though using pencil and paper and various courier services.

During the time from whence a filmmaker submits his/her package and the festival reviews his/her application, communication between the two parties consists of using some combination of telecommunications, facsimile, and e-mail. Since communications occur through some combination of the various means, neither the filmmaker nor the festival coordinators can maintain continuity in their respective records. Consequently, if a need arises to reference a past communication, the likelihood of locating or recalling it may be difficult.

Another problem with this obsolete method is programming screening times and venues for all accepted films. Currently, festival coordinators manually record the screening times and venues for all accepted films on a spreadsheet or bulletin board. As such, they have to manually assign an appropriate time slot within a show and within a venue to accommodate each film's running time and exhibition formats, and manually re-calculate the cumulative running time of each show. This process is very time consuming because it may take many hours to perform all the calculations using pencil and paper.

At the final stage of processing the submissions, where festival catalog designers and the press at large want access to the filmmakers press kits and video clips, festival catalog designers must scan in such information and members of the press must receive duplicate copies. This is the only method currently available to distribute press kits, video clips, and glossy photos to the press and catalog designers. As a result of using this antiquated method for distribution, festival coordinators must make several trips to the post office, sending out weighty videotapes and press kits to the media.

After a festival event is over, festival coordinators must manually complete international customs labels, express mailing tags, and insurance forms, all of which is very time-consuming and obsolete, in order to return film prints and master screening videos to participating filmmakers.

DRAWINGS

These and other features, aspects, and advantages of the present invention will be better understood from the following drawings, description and appended claims, where:

FIG. 12 is an illustration showing an example of a user interface of a computer according to the embodiment of the invention shown in FIG. 8.

DETAILED DESCRIPTION OF THE INVENTION

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

The present invention is a computer-based method of administering submissions by applicants for over a thousand international festivals. The computer processing of information from the data entries is significantly more efficient and convenient than the current and traditional method of administering filmmakers' entry forms, press kits, video preview copies, and entry fees using mail couriers and manual office systems. The application processing and administering system of the present invention comprises data entry and processing means for filmmakers and film festivals, including means for creating customized entry forms that will be acceptable in all a thousand or more festivals. A service bureau's data processing and digitizing of entry forms, press kits, videos, and fees will provide the festivals with the filmmaker's entire package online. The burden of filmmakers' composing their press kit copy, videocassette copy, entry form, and bank draft to send to each and every festival after researching all the information for each festival to check for qualifications is thus alleviated. On the other hand, the festivals will also have access to each filmmaker's package online thus alleviating the burden of searching every package individually by unpackaging each package, shifting through for relevant information within the package and then passing the information through to different people for review and processing.

Figure 1:
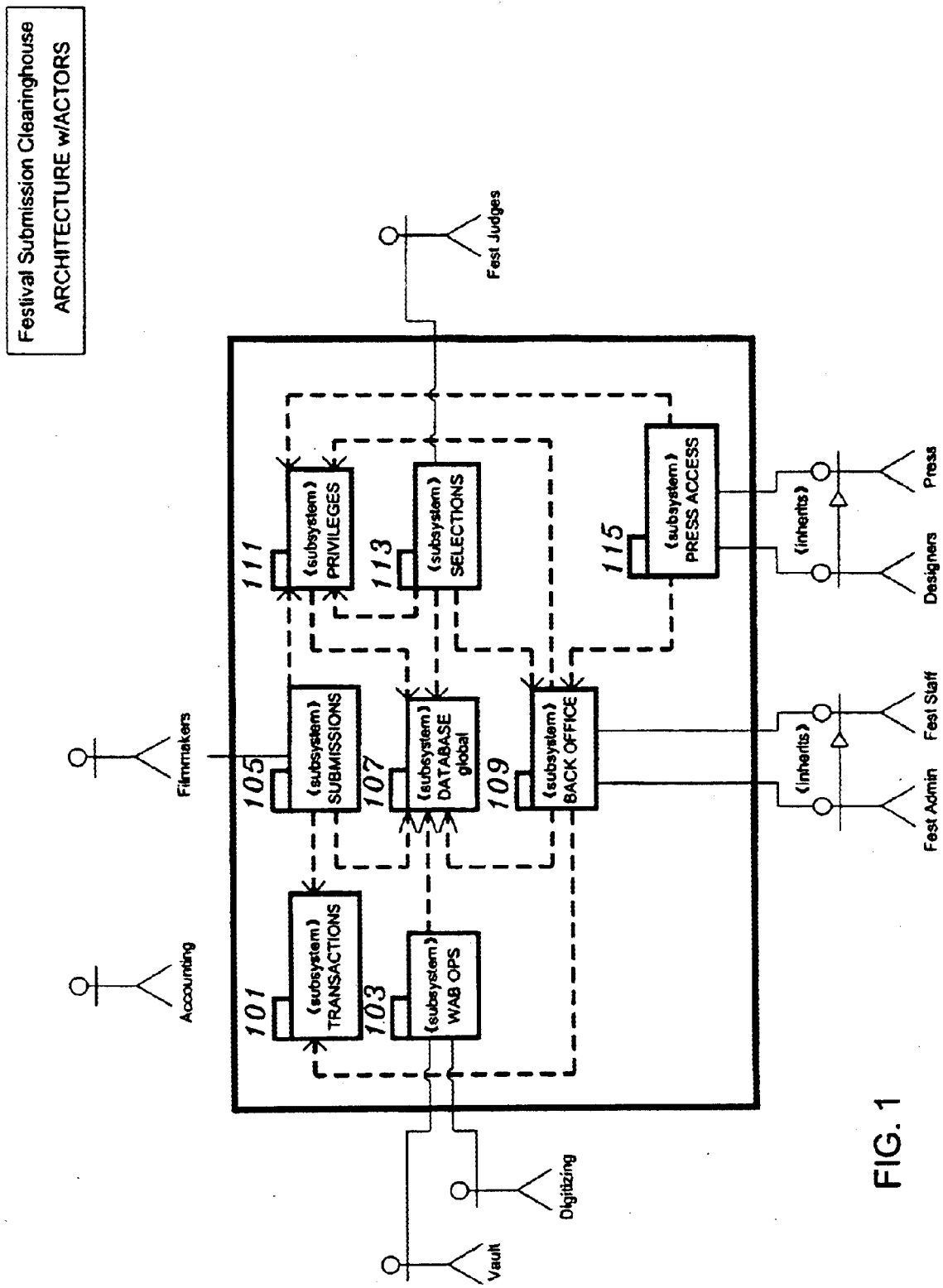
FIG. 1 is a diagrammatic illustration of a computerized submission and processing system according to the embodiment of the present invention.

FIG. 1 is a diagrammatic illustration of a computerized submission and processing system according to the embodiment of the present invention. One advantage of the invention is that s each film festival need not have its own server to host filmmaker submissions. The submissions can be hosted on a server 107 operated by a service bureau on a subscription basis to the festival. Thus, multiple festivals 109 may have access to the same film assets hosted by the same service bureau. In the preferred embodiment, the film asset is called a "project." A project consists of entry form data, a press kit, and a video preview.

Figure 2:
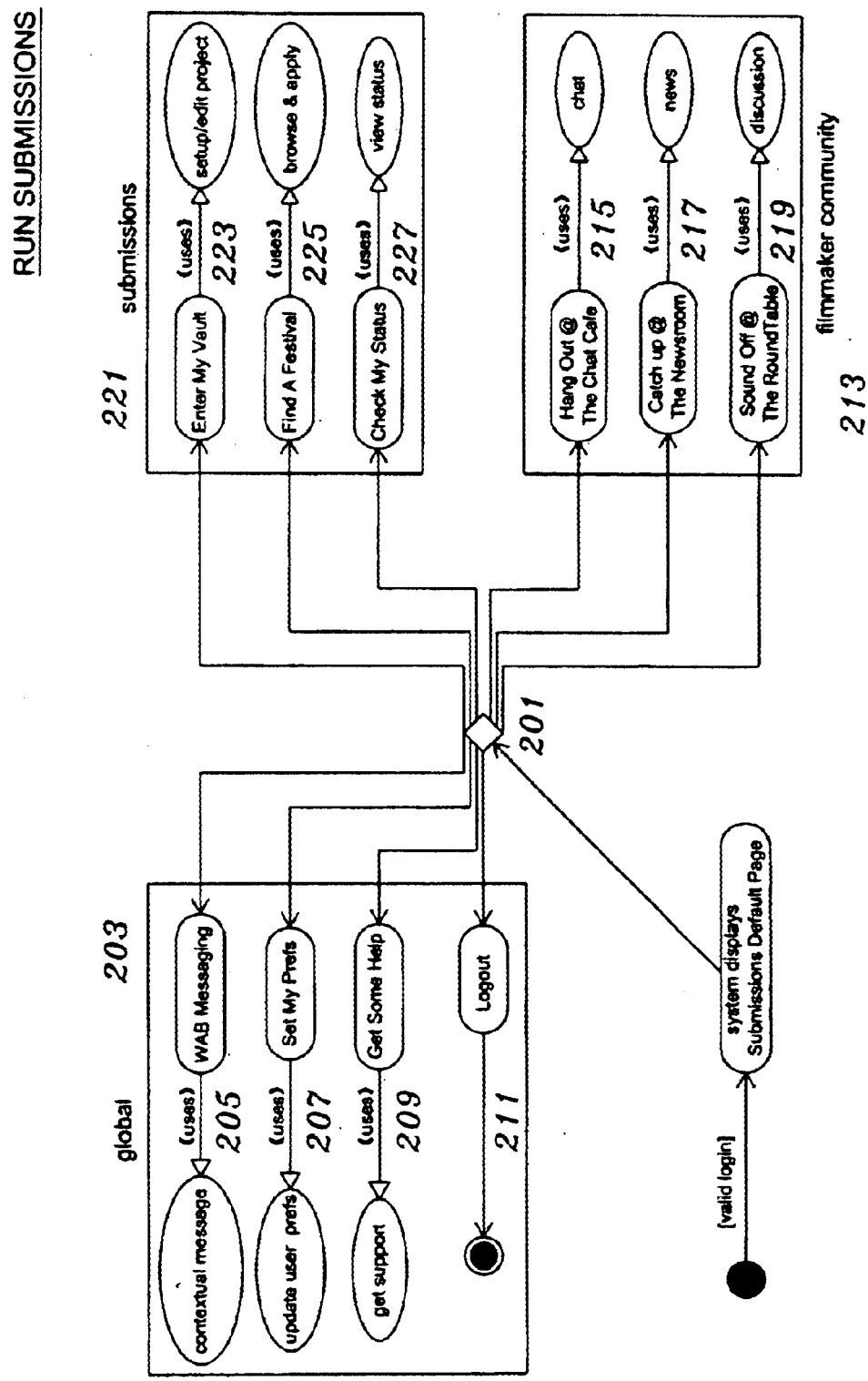
FIG. 2 is a diagram illustrating an example of processing submissions from the operational perspective of the filmmaker, performed by a computer and a user running the software program shown in FIG. 1.

FIG. 2 is a diagram illustrating an example of processing submissions from the operational perspective of the filmmaker, performed by a computer and a user running the software program shown in FIG. 1. In the preferred embodiment, each filmmaker interested in submitting his/her project to a festival may use the service bureau's submissions software 221 to setup a project 223 in the service bureau's database. Once established in the database, a filmmaker may use the service bureau's comprehensive database of over 1000 international film festivals to browse and apply 225 to any listed film festival via the Internet. Subsequent to making a submission, a filmmaker may view the current or historical selection status 227 of any given submission to a film festival. A filmmaker may also send and receive "contextual messages" 205 pertaining to a given submission, which may be displayed and administered from the view status 227 page.

Figure 3:
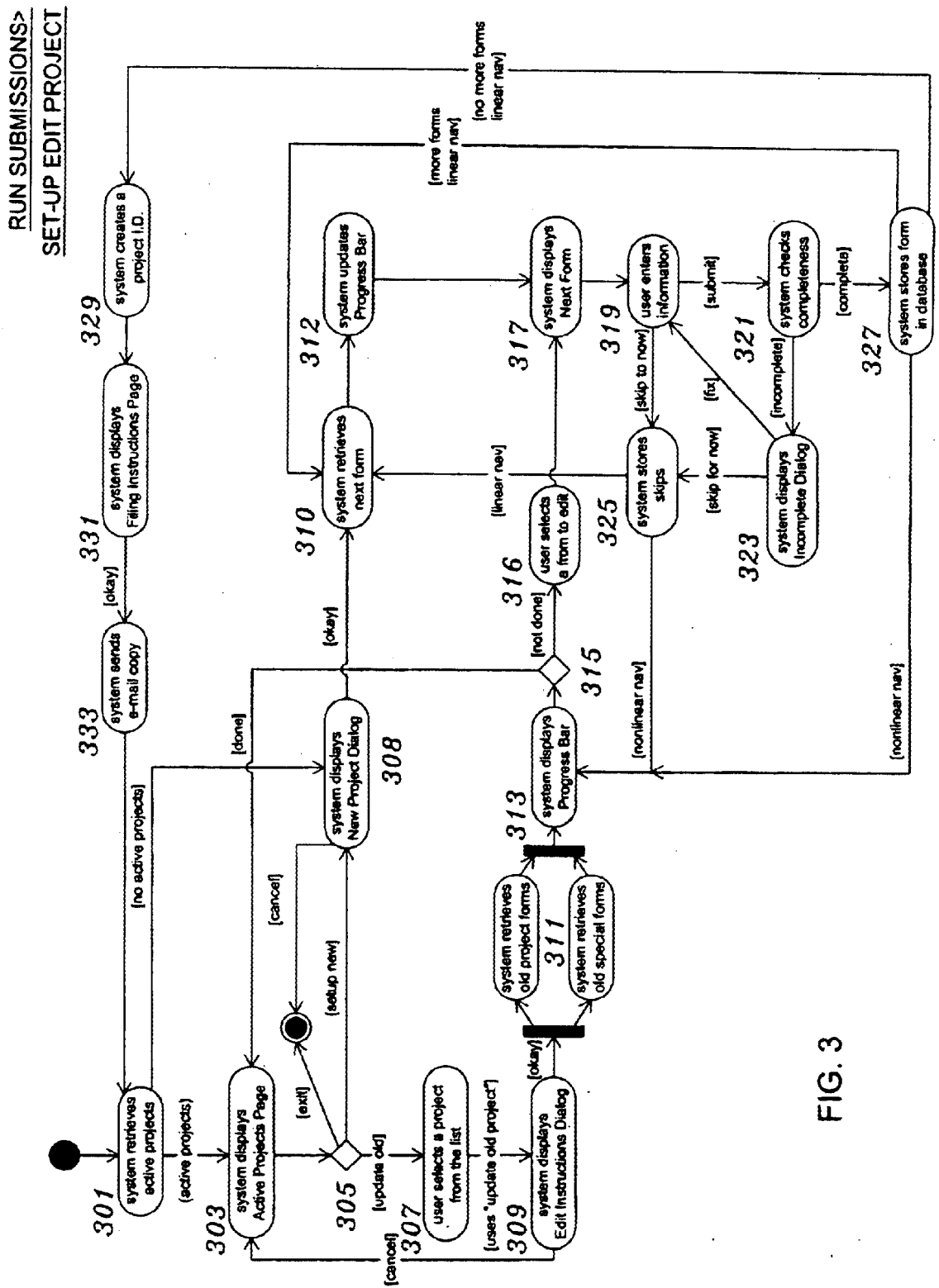
FIG. 3 is a flowchart illustrating an example of a sequence of steps performed by a computer and a filmmaker user performing a film project setup according to the embodiment of the invention shown in FIG. 2.
Figure 13:
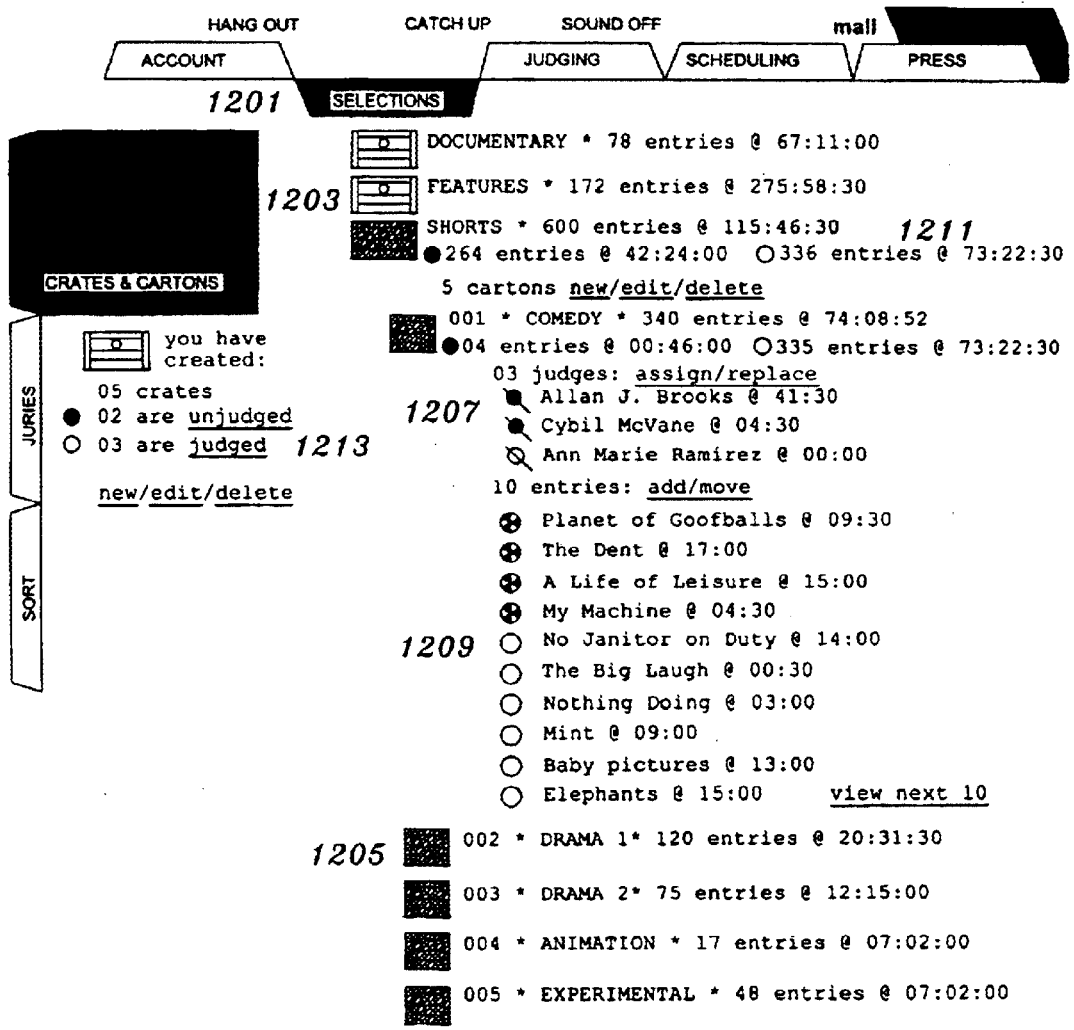
FIG. 13 is an illustration showing an example of a user interface of a computer according to the embodiment of the invention shown in FIG. 3.

FIG. 3 is a flowchart illustrating an example of a sequence of steps performed by a computer and a filmmaker user performing a film project setup or performing an update to an extant project according to the embodiment of the invention shown in FIG. 2. The system presents the option 305 to update an extant project or to setup a new project. The project data are updated or entered anew by way of a form 311, which receives the data common to the entry forms of all 1000 international film festivals. The advantage of filing a single, comprehensive online form is that the filmmaker may enter project data once, rather than separately for each festival for which he/she wishes to make a submission. The form FIG. 13, in the preferred embodiment, includes over 100 questions regarding a project, such as multiple synopses, year and place of production, production contacts, distribution status and screening history, preview and exhibition formats, original and foreign language versions, press kit information, genre and niche categorizations, student verification, etc. Each filmmaker is also able to submit a single video and a single press kit to the service bureau, where the service bureau digitizes both the film and press kit on its server, thus eliminating the filmmakers need to submit the package to each festival separately.

The project setup scenario, in the preferred embodiment, includes software checks for completeness of information 221 and tracking of skipped forms 225 to ensure that filmmakers setup a project with the minimal information that is required to fulfill a typical film festival entry, since some information is required by every film festival but not all information is required by every film festival. To this end, a filmmaker is required to view and fill each form in a preferential order maintained by the system during the initial setup of a project, called "linear navigation" in the preferred embodiment. However, when opting to update an extant project 207 the filmmaker is routed by the computer system to a "non-linear navigation" paradigm, whereupon forms may be updated in any order selected by the filmmaker. The computer assigns a serialized project identifier 229 to all new projects entered into the database, which is used to track, recall, and assign access permissions throughout the festival submission system shown in FIG. 1. The project identifier is also tied to a filmmaker user identification for automated retrieval during the filmmaker login process 201 shown in FIG. 2, which login is pre-requisite to any use of the festival submission system. The advantage of this method is that a filmmaker may access the system once at the beginning of a session and then switch freely among his/her hosted projects within the system.

A second required component of the festival submission system shown in FIG. 1 is a festival information component, which is entered and stored in a database of comprehensive festival listings for each of over 1000 international film festivals. In the preferred embodiment, a festival listing includes such comprehensive data as contact information, rules and regulations, terms of entry, and categories of entry. Each category of entry is further stipulated by such comprehensive guidelines as preview and exhibition formats, deadlines and fees, year and place of production, press kit requirements, original and foreign language screening requirements, premiere requirements, etc.

Festival organizers may setup a festival or update an extant festival by way of a form, as similarly elaborated in FIG. 3. The computer assigns a serialized project identifier to all new festivals entered into the database, which is used to track, recall, and assign access permissions throughout the festival submission system shown in FIG. 1. The festival setup process includes checks for completeness of information and tracking of skipped forms, to ensure that the minimal data is available to the system in order to fulfill a fully automated submission to the festival. A festival may require certain information of applicants that is not represented on the form common to over 1000 international film festivals. In this scenario, a service bureau system administrator may design a form, called a "special form" in the preferred embodiment, which is attributed to a festival identifier and becomes a permanent addendum to a festival's online entry form.

Figure 4:
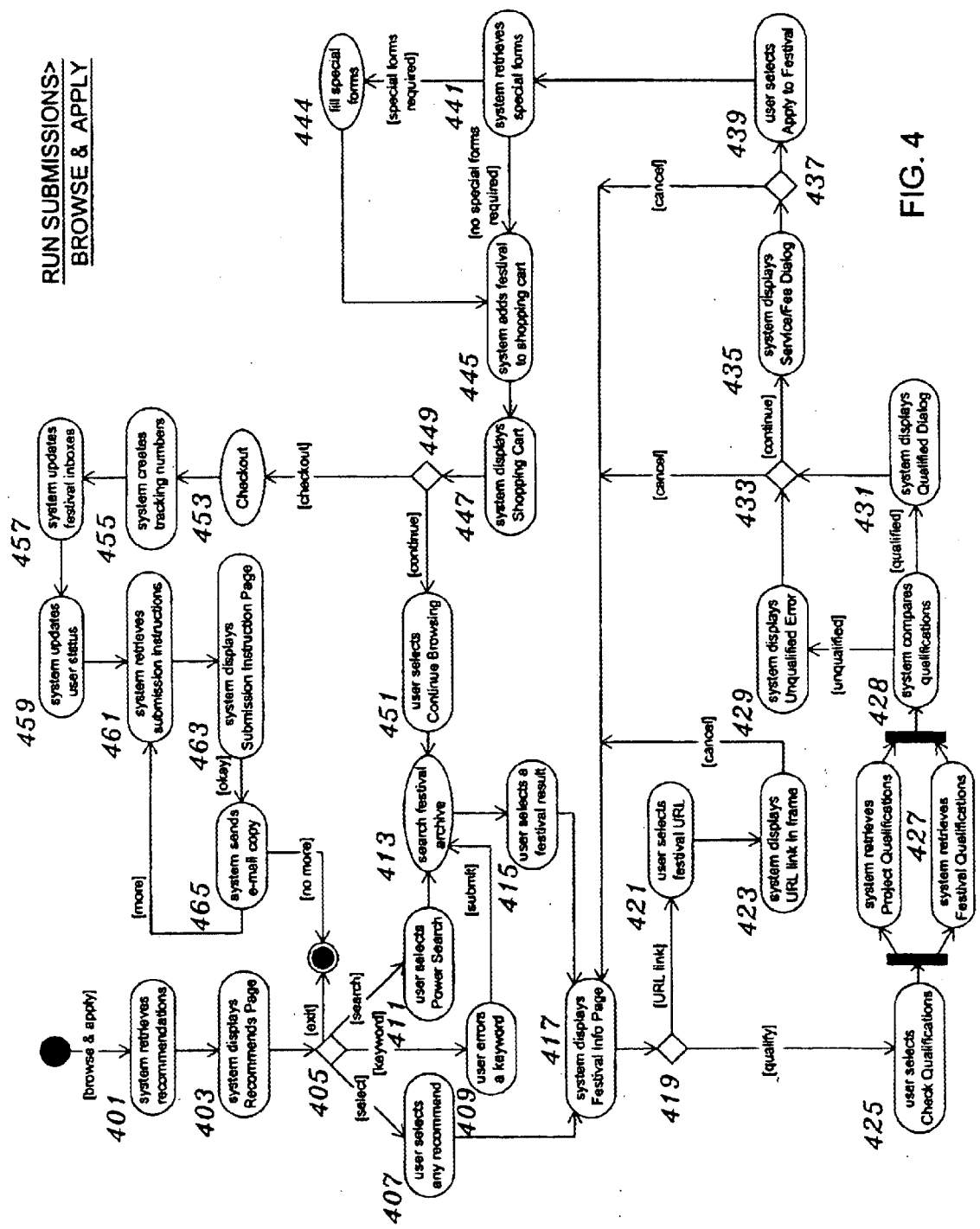
FIG. 4 is a flowchart illustrating an example of a sequence of steps performed by a computer and a filmmaker user performing browse and application function according to the embodiment of the invention shown in FIG. 2.

FIG. 4 is a flowchart illustrating an example of a sequence of steps performed by a computer and a filmmaker user performing browse and application function according to the embodiment of the invention shown in FIG. 2. The filmmaker may select to browse and apply regarding any one particular project that is hosted within the system or, in the case of browse only, the filmmaker may browse the festival database more generally, with regards to no particular project. Upon entry to the browse and apply function, the system automatically assumes a default project, which is set by the filmmaker in a preferences component 207 shown in FIG. 2.

In the first sub-component of browse and apply, the system uses the default project, or any other project selected by the filmmaker, to suggest from the database those festivals most appropriate to the given project, which suggestions are displayed on the computer screen 403 and called "recommendations" in the preferred embodiment. The system generates such recommendations by comparing and most nearly matching key information in the filmmaker project database to concomitant information in the festival listing database—although in the preferred embodiment these databases are considered to be a single database, sharing data classes and data tables. This key information includes such basic matches as genre and niche, entry deadline, film length, etc. The advantage of this method of recommendations is that a filmmaker would not otherwise find, through the time-consuming process of manual searching, those festivals among the more than 1000 international film festivals for which his/her project is most qualified.

In a second sub-component of browse and apply, the filmmaker also has the option 405 to manually search 413 and select 415 from a list of festivals in the service bureau's database just by a text entry 409 using the keyboard on his/her personal computer. This type of deep search allows a filmmaker to refine a set of results by filtering a comprehensive set of festival criteria, including such information as genre and niche, entry deadline, event dates, film lengths, prizes and awards, native languages and foreign versions accepted, competitiveness, fees, premiere and distribution requirements, preview and exhibition formats, etc., including all of the non-private data entered by over 1000 festival organizers in the aggregate. The advantage of this type of deep search allows a filmmaker to pinpoint those festivals to which he/she is interested in applying, and simultaneously eliminate all others, without having to manually review over 1000 international film festival publications of rules, regulations, and entry forms—whether they be available in print or electronic form.

No matter if a search result is achieved by way of automated recommendations, keyword entry, or a deep search and filter process, the system displays all matching query results in a list format. The filmmaker may select a particular festival 415 from a result list by a point-and-click method of using the mouse on his/her personal computer, causing the system to display a detailed festival listing for an individual festival 417. The listing includes all such non-private information as has been entered by the festival organizer, including a hyperlink to the festival's home page 423 on the Internet. Each category of entry is also displayed as a hyperlink, which may be expanded on a subsequent page to list the individual and specific criteria for entry to a given category of a given festival. The advantage of this method of sub-dividing festival listings into entry categories is that a filmmaker is able to select the appropriate category for his/her project, since it is rarely enough to more generally enter most festivals.

In the third sub-component of browse and apply, a filmmaker may choose to save a festival listing or multiple festival listings for review at a later date. The system creates hyperlinks directly to these saved festival listings, which are made available to the filmmaker in what is called a "watch list" in the preferred embodiment. The advantage of a watch list is that a filmmaker can eliminate the need for repeated searching, even though he/she may not be ready to act on a festival entry in a given user session. The "watch list" is further integrated to the system in that a filmmaker can request that a reminder e-mail notice be automatically sent out to him/her by the system in a specified time advance of the festival's submission deadline.

In the fourth sub-component of browse and apply, an image button on the computer screen allows a filmmaker to request that the system check the qualification 425 of his/her project against the detailed regulations governing a particular category within a festival. The system performs this 427/428 by a similar matching method to that used for generating recommendations, except with the addition of qualification criteria, such as date of completion, preview and exhibition formats, press kit requirements, county of origin, premiere and distribution status, etc. This automated qualification function prevents filmmakers from submitting projects that are unqualified without having to comb through the fine print of festival rules and regulations, and it prevents film festivals from receiving projects that are unsolicited, as may otherwise often occur. If a given project is deemed by the system to be unqualified for a given festival, a warning is displayed 429 to the filmmaker, offering the option 423 to cancel the application process or to override and continue.

In the fifth sub-component of browse and apply, one of several submission service options will be offered to the filmmaker, according to the preferred embodiment, and depending on the type of service agreement in place between the service bureau and a given festival.

At "Level 1", only the festival information will be displayed but the filmmaker will not be able to proceed beyond this point. Even at this initial stage, the means of a digitized computer database allows the filmmaker to avoid shuffling through various entry forms retrieved by placing phone calls to the festivals and reading through the numerous pamphlets to check for deadlines, month of event, awards, and screening categories among other things.

At "Level 2", the service bureau's software will access the database and generate a completed entry form using an exact facsimile of the festival's current printed or electronic form. If "special forms" are required by a given festival, the filmmaker will be prompted to submit additional information 443 using the same interface and form-fill process described in FIG. 3. Subsequently, the completed entry form will either be e-mailed or faxed to the requesting filmmaker as, for example, a PDF formatted document. When the requesting filmmaker prints the information, the form can be submitted to the festival via standard parcel post, along with the press kit, video preview copy, and entry fee. Although standard procedure for submission of entrance package is required, all the above-mentioned prerequisites are still eliminated. Additionally, the filmmaker no longer has to call into the film festival for entry packet because the filmmaker will be able to download the application form from the service bureau's database.

At "Level 3", no paper forms are generated, rather the service bureau software collects the festival entry fees and any service bureau processing fees, where applicable, using an e-commerce shopping cart paradigm 453 and makes the filmmaker's application available to the partner festival online as part of the Festival Back Office Suite. In essence, the filmmaker's application is submitted to the requested festival 457 on the filmmaker's behalf. Subsequent to the submission of filmmaker's application, the service bureau sends the filmmaker a confirmation via email 465 along with instructions 463 and tracking numbers 455 for submission of the press kit and video preview copy to be sent directly to the festival via standard courier. At Level 3, only the application and fees are sent directly to the festival on behalf of the filmmaker. The filmmaker will then send in the press kit and the video preview copy to the festival with the tracking numbers so that the festival can place the two together upon receipt of them. In addition to eliminating the problems as stated above, the filmmaker is no longer obligated to send in a separate application and a bank draft or credit card number to the multiple festivals where the filmmaker chooses to submit his/her package.

At "Level 4", in addition to all the services provided for in Level 3, the filmmaker can send the service bureau the press kit to be digitized and stored in the service bureau's computerized database. Upon receipt, the service bureau digitizes the press kit and stores it in the service bureau's server. Other than eliminating all the steps for the filmmaker as stated in Level 3, the filmmaker is no longer required to send in a copy of his/her press kit to the multiple festivals of his/her choosing. Along with the tracking number, the filmmaker will only have to send in the copy of the video preview.

At "Level 5", the service bureau will provide the filmmaker with full service, which includes all the services provided for in Level 4 in addition to providing filmmaker with the option to send to the service bureau his/her video preview copy to be digitized and stored in the service bureau's database. This option eliminates all paperwork or any need to send anything to the multiple festivals. The means of this computerized database and storage system will permit the filmmaker to submit one entry form, one press kit, and one copy of his/her video preview that can subsequently be viewed by multiple festivals online without having to re-send them. When the service bureau receives the filmmaker's complete package, the service bureau digitizes the press kit along with the video. The digitized press kit and copy of the video are stored on the service bureau's servers and on outsourced servers. This enables any festival, its judges, or its authorized representatives to retrieve the videos and press kits from the service bureau's servers and view the information directly, thus eliminating the hassle of opening envelopes and individually sorting out all information by hand. The means of a digitized computerized submission system makes the entry process much more efficient and less time consuming for both filmmakers and film festivals. Since complete submissions packages are made available to festivals virtually instantaneously, filmmakers may be certain that they have met required deadlines, without considerations of postmark and delivery dates, or the undependability of standard mail couriers.

Figure 5:
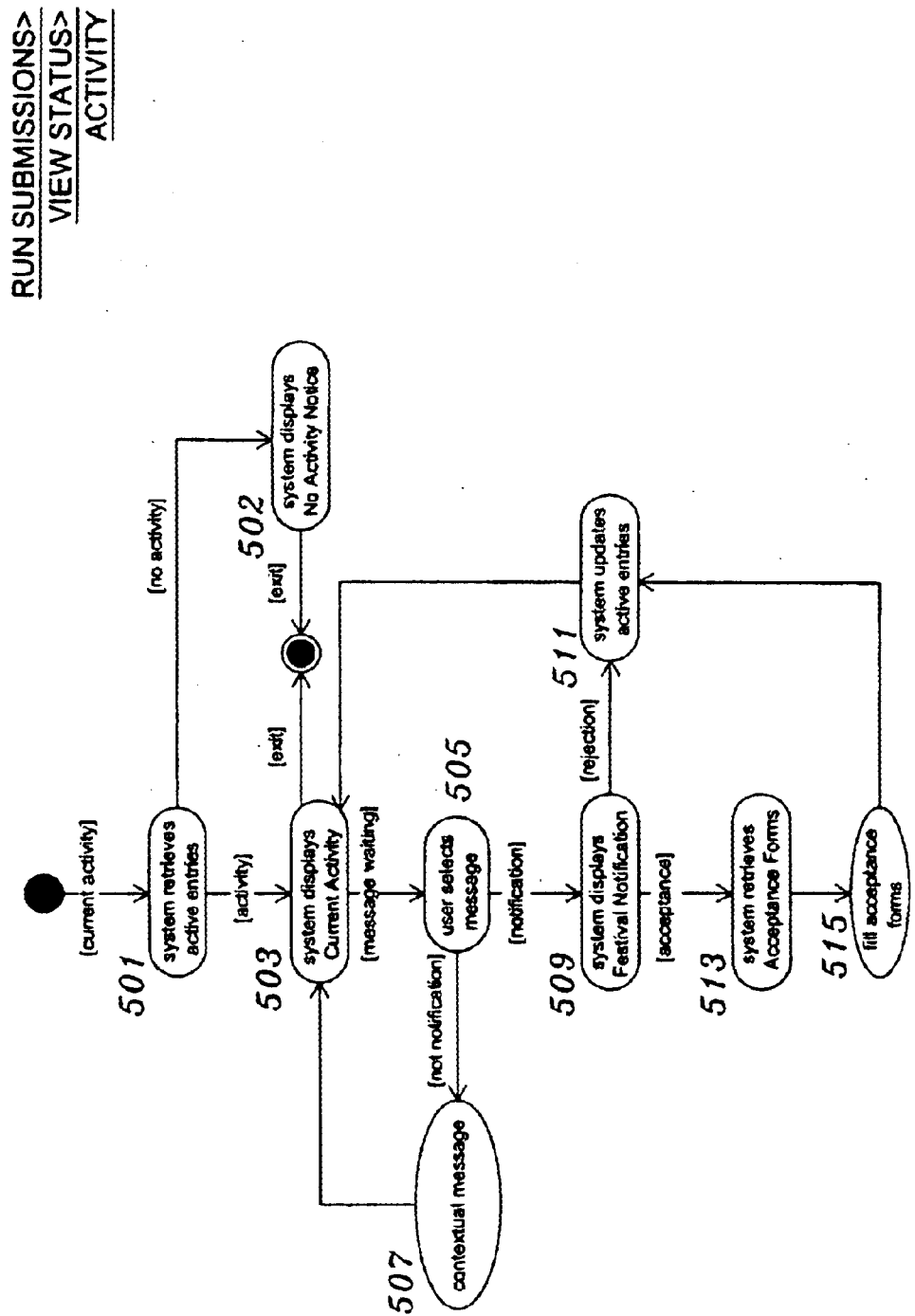
FIG. 5 is a flowchart illustrating an example of a sequence of steps performed by a computer and a filmmaker user performing status check function according to the embodiment of the invention shown in FIG. 2.

FIG. 5 is a flowchart illustrating an example of a sequence of steps performed by a computer and a filmmaker user performing status check function according to the embodiment of the invention shown in FIG. 2. The system retrieves the statuses 501 for all prior and current submissions to festivals across all prior and current projects associated with a filmmaker's user identification. The system presents active and historical status in an expandable list view, using festival names as headers. The most general status indicators would include, for example, pending, accepted, or rejected.

A sub-component of view status is multi-directional electronic correspondence. Correspondence may be between a given film festival and a filmmaker, or between the service bureau and a filmmaker. Messages are organized and systematically contextualized so as to appear within the expanding views of the festivals to which they directly pertain. This eliminates the hassle for all involved parties of trying to maintain a record of all correspondence through note pads, fax sheets, and regular courier mail. Either the filmmaker or the festival can trail all correspondence between them at any time for easy reference. In the preferred embodiment, this function is performed by software that refers to a system-wide messaging database, wherein correspondences are assigned message types and are tagged with one or more of user IDs, film project IDs, film festival IDs, and service bureau departmental IDs. As opposed to a general "catch-all" mailbox paradigm, messages are always retrieved and displayed within their functional context, throughout the system's integrated components. Examples of message types include acceptance notifications, rejection notifications, hospitality notifications, print shipment notifications, error notifications, tech support notifications, casual correspondence, etc.

One embodiment of contextual messaging is shown in FIG. 5, where an awaiting notification message may be selected 505 and viewed 509 by a filmmaker. In the case of a project having been accepted to a festival, the system retrieves a festival's customized acceptance forms 513 which may then be filled and filed electronically 515. Formerly, this exchange would have been executed via fax or standard mail courier.

Figure 6:
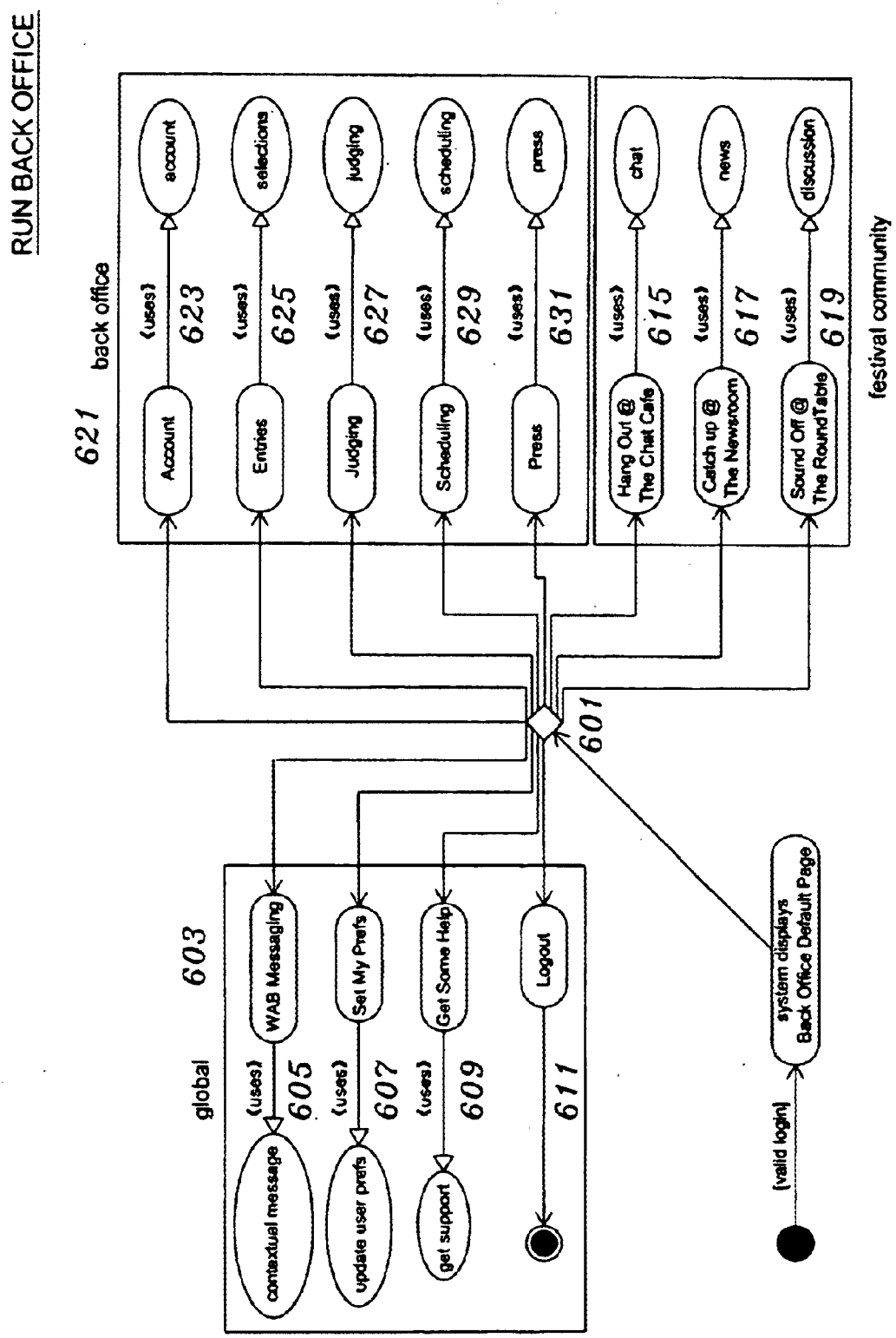
FIG. 6 is a diagram illustrating an example of processing submissions from the operational perspective of the film festival, performed by a computer and a festival user running the software program shown in FIG. 1.

FIG. 6 is a diagram illustrating an example of processing submissions from the operational perspective of the film festival, performed by a computer and a festival user running the software program shown in FIG. 1. In the preferred embodiment, over 1000 international festivals film festival may utilize the system to perform and customize common "back office" functions, depending on the type of service agreement in place with the service bureau, including multi-directional correspondence 605 as described above. Additionally, festivals will be able to access the service bureau's online database and online software suite via the Internet using an ASP (Application Service Provider) model to expedite the receipt, sorting, and tracking of project entries 625, the selection and judging of project entries 627, the scheduling of screenings for accepted project entries 629, and the posting of previews for scheduled screenings 631 to the press. The system is fluid and integrated, with a redundant user interface FIG. 12 that traffics digitized filmmaker submissions, or "assets," through the various processes of a film festival. In addition to this class of "asset management tools," exemplified in FIG. 8, the system also features a class of "resource management tools," exemplified in FIG. 9, which may be used to assign and manage specialized staff throughout these festival processes, such as judges, workers and volunteers, and outside media and reporters.

Figure 7:
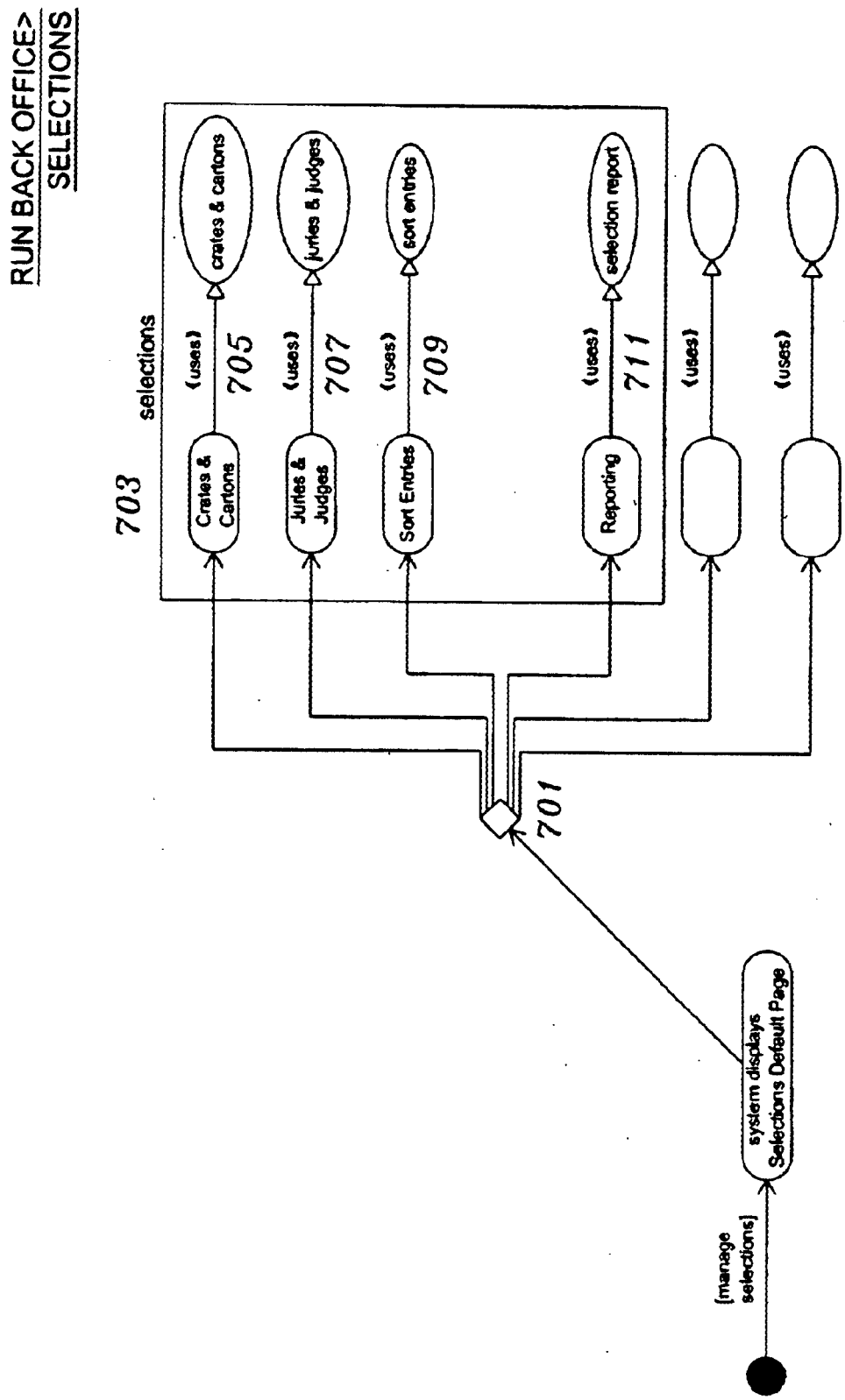
FIG. 7 is a diagram illustrating an example of processing selections from the operational perspective of the film festival, performed by a computer and a festival user according to the embodiment of the invention shown in FIG. 6.

FIG. 7 is a diagram illustrating an example of processing selections from the operational perspective of the film festival, performed by a computer and a festival user according to the embodiment of the invention shown in FIG. 6. A festival administrator may use the selections software tools 703 to sort entries into "crates & cartons" 705 for judging and to assign "juries and judges" 707.

Figure 8:
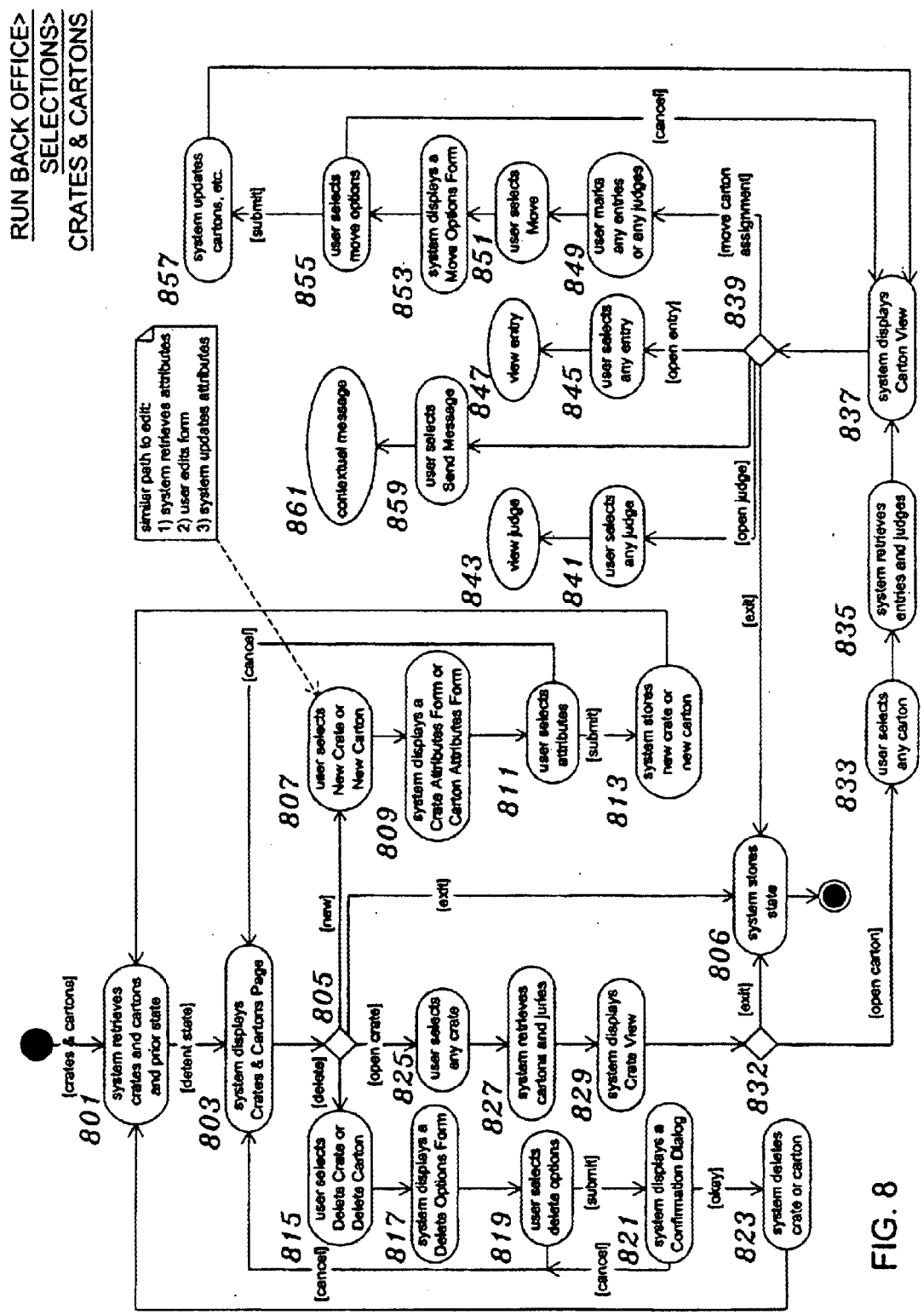
FIG. 8 is a flowchart illustrating an example of a sequence of steps performed by a computer and a festival user performing asset management and filing tasks according to the embodiment of the invention shown in FIG. 7.

FIG. 8 is a flowchart illustrating an example of a sequence of steps performed by a computer and a festival user performing asset management and filing tasks according to the embodiment of the invention shown in FIG. 7. This illustration of "crates & cartons" is specific to the process and administration of festival selections 703, but the same process may be generalized to the other processes in the preferred embodiment such as scheduling 629 and press outreach 631, since these other processes are iterations of a similar conceit. Presented in total, this present class of "asset management tools" is a customizable, object-oriented filing system that fulfills the common organizational requirements of film festivals through the customary phases of film festival administration. The system therefore employs the industry jargon common to film festivals in the naming of its component objects. For example, as filmmaker projects are trafficked through the three phases here enumerated in the preferred embodiment, the objects assume different names, such that a project is called an "entry" during selections, a "screening" during scheduling, and a preview during press outreach, and where an entry is defined as a filmmaker project pending decision by a festival selection committee, a screening is defined as a project that has been accepted to a festival, and a preview is defined as a project that may have been edited for review by the press.

One component that is required in the present system is a group information object, called "crates" in the preferred embodiment. A subgroup object is also required to effectively sort and manage the high volume of submission assets, called "cartons" in the preferred embodiment. A crate is a collection of one or more cartons 1203; a carton is a collection of one or more entries 1205. An entry may be assigned to a carton 1209, but not directly to a crate. In their default states, entries are collapsed into cartons and cartons are collapsed into crates, such that only the top-level of crate is visible in a displayed list of crates 829. This hierarchical, electronic filing system for filmmaker entry forms, press kits, and video media has clear advantages over traditional methods such as bookshelves and file drawers and piles.

FIG. 8 shows the process by which a festival administrator creates and edits attributes for crate and carton objects 811 by way of a form. The attributes assignable in these forms have the ability to be "informational labels" for a given object, or in many cases "rules and limiters," which govern an object's behavior as an organizational tool. Examples of informational crate attributes may include name and description. Since crates may commonly be named for a festival's categories of entry, there is the option to assign a category limiter to a crate, such that the crate may only store entries submitted in a specified category. If the user attempts to break the limiter, a warning is presented, with the option to override the rule and continue. Examples of informational carton attributes may include name and description. Also, a carton can only exist if it is assigned to a crate. Additionally, the user may set limiters such as the total hours and minutes of entries that may be stored in a carton; the number of judges that must be assigned to a carton; the languages, nationalities, genres, and running times of projects placed in a carton. All crates and cartons are assigned a festival ID and stored 613 in the service bureau's database. In keeping with the ASP model, little or no software and data resides on the desktop computer of the user.

Figure 9:
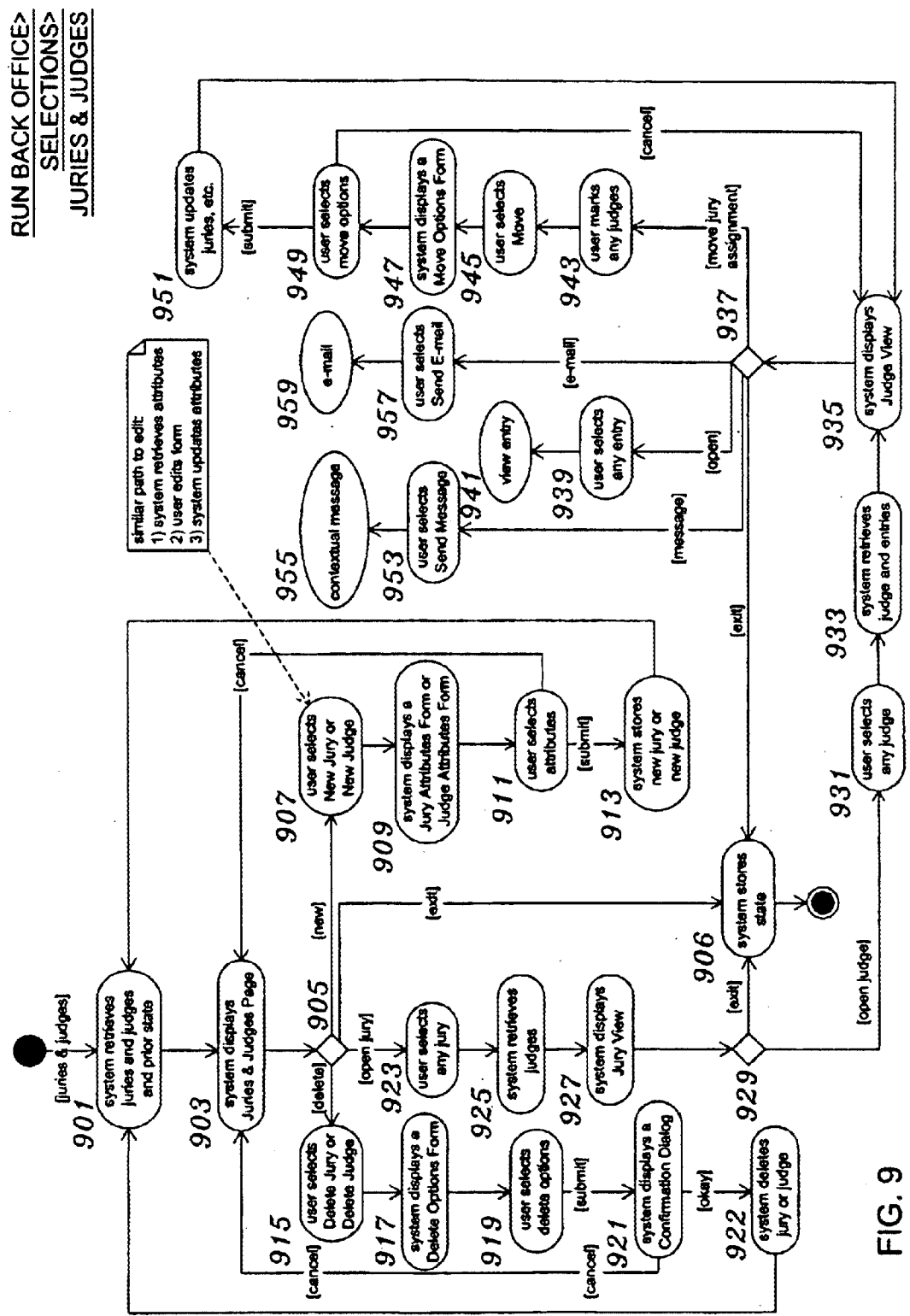
FIG. 9 is a flowchart illustrating an example of a sequence of steps performed by a computer and a festival user performing human resource management tasks according to the embodiment of the invention shown in FIG. 7.

FIG. 9 is a flowchart illustrating an example of a sequence of steps performed by a computer and a festival user performing resource management tasks according to the embodiment of the invention shown in FIG. 7. This illustration of "juries and judges" is specific to the process and administration of festival selections 703, but the same process may be generalized to the other processes in the preferred embodiment such as scheduling 629 and press outreach 631, since these other processes are iterations of a similar conceit. Presented in total, the present class of "resource management tools" is a customizable, object-oriented human resource allocator that fulfills the common organizational requirements of film festivals. The system therefore employs the industry jargon common to film festivals in the naming of its component objects.

One component that is required in the present system is a group information object, called "juries" in the preferred embodiment. A subgroup object is also required to represent individual persons, called "judges" in the preferred embodiment. A jury is a collection of one or more judges; a judge is defined by a profile. In their default states, profiles are collapsed into judges and judges are collapsed into juries, such that only the top-level of jury is visible in a displayed list of juries 927.

FIG. 8 shows the process by which a festival administrator creates and edits attributes for jury and judge objects 911 by way of a form. As with crates and cartons, attributes assignable in these forms have the ability to be "informational labels" for a given object, or, in many cases, "rules and limiters," which govern an object's behavior as an organizational tool. Examples of informational jury attributes are name and description. Also, since juries may commonly be set to a standard number of judges, there is the option to assign limiter to a jury, such that the jury may only be comprised of x judges. Examples of informational judge attributes are name, address, telephone contact, e-mail address, and system user ID. A judge may be assigned directly to a carton or a crate, or may be assigned as part of a jury to a carton or a crate.

Figure 10:
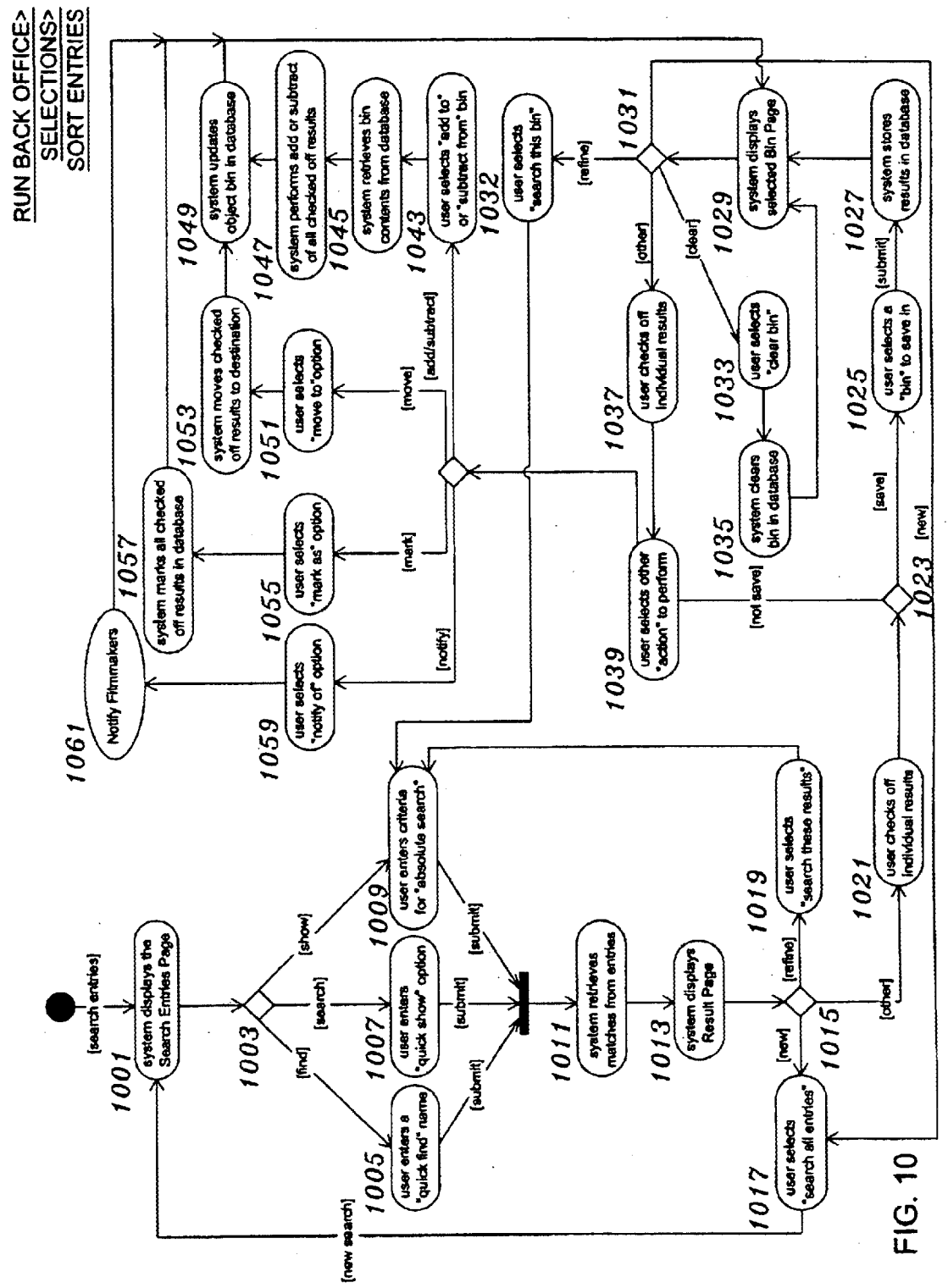
FIG. 10 is a flowchart illustrating an example of a sequence of steps performed by a computer and a festival user performing searches, sortings, taggings, storages and other operations on assets according to the embodiment of the invention shown in FIG. 7.

Filmmaker entries are searched, sorted, moved into cartons, and "batch processed" using a comprehensive database search tool, shown in FIG. 10. With this tool, festival representatives are able to find a single entry 1005, recall en masse entries matching several certain pre-determined criteria 1007, or search for entries using over 100 combinations of criteria filters 1009, drawing on data collected in the filmmaker entry form and stored in the service bureau database. In the preferred embodiment, these filters include but are not limited to, preview and exhibition formats, premiere and screening histories, year of production, country of origin, and production budget. The certain predetermined recall criteria may include projects that are accepted, rejected, waiting to be judged, orphaned in the system, or marked for notification. Results of any search 1011, regardless of method, are displayed in a result page 1013, which may be further refined 1019 by adding to or subtracting from any of the initial search criteria. This alleviates the hassle of shuffling through paper entry forms and looking for matches to a given query, which may often include multiple, mutually exclusive criteria, which is more efficiently executed by a computer.

This search tool is fully integrated into the present invention in that results can be stored in bins 1025, and set aside there in preparation for one of many "batch processes" 1039 having to do with the customary administration of a film festival, such as notifying filmmakers of their acceptance or rejection 1061. The contents of bins can also be moved into cartons 1051 for processing by juries and judges.

Crates and cartons, in addition to their function as filing tools and human resource schedulers, offer the advantage of auto-calculation. Whenever crates and cartons are viewed on screen, the system tabulates the total number of entries and the cumulative running time of entries contained within 1211, as well as the total number and the cumulative running time of those entries which have been fully judged and of those entries still in deliberation. Each judge object within a carton also displays a similar automatic tabulation reflecting the number of entries, the total running time, and the total workload completed and pending 1207.

Figure 11:
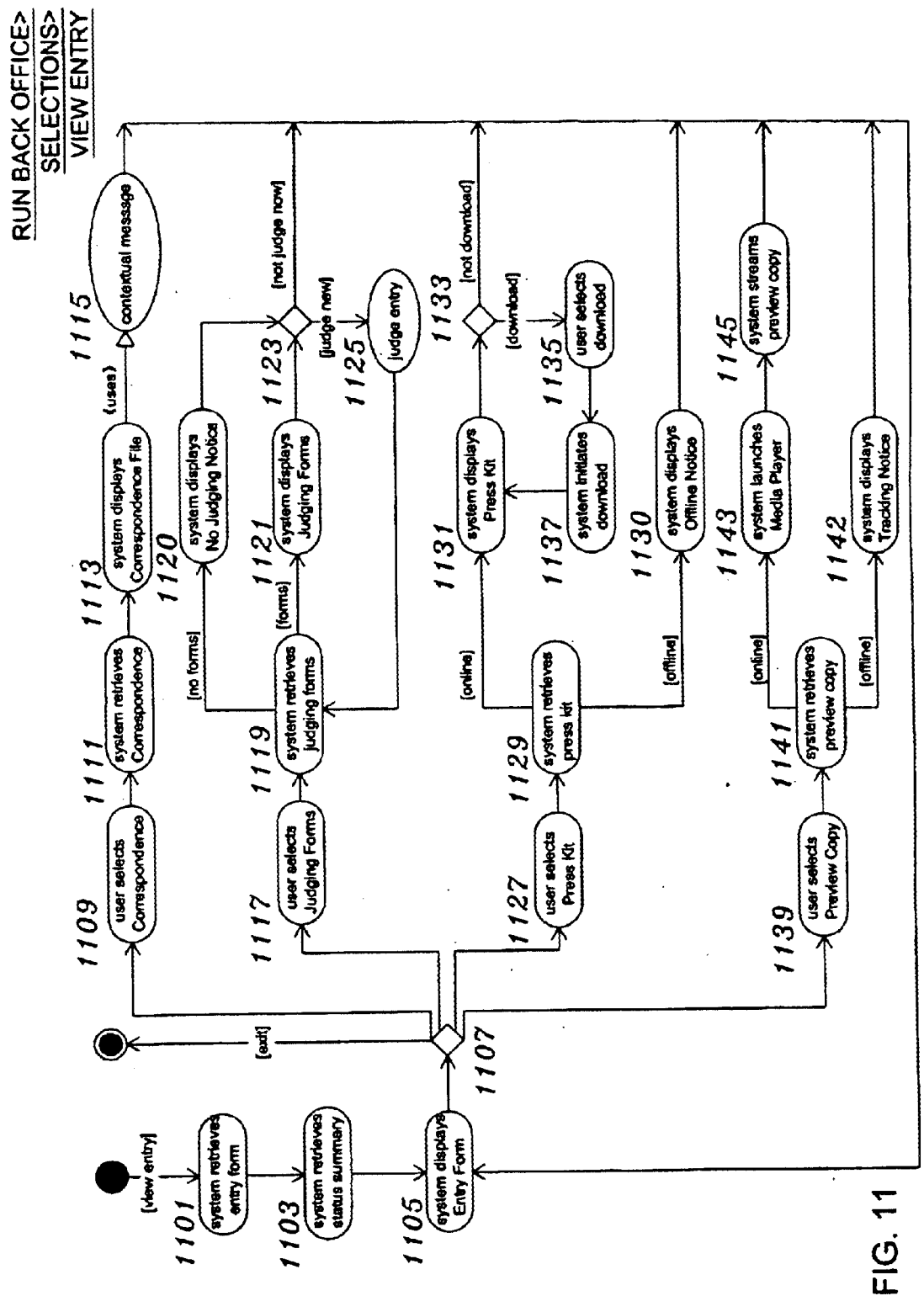
FIG. 11 is a flowchart illustrating an example of a sequence of steps performed by a computer and a festival user performing viewing and assessment of assets according to the embodiment of the invention shown in FIG. 7.

Within a carton, a festival administrator may select any judge 841 by a point-and-click method of using the mouse on his/her personal computer. The system displays a list of the judge's entire workload 843. Within a is carton or a judge, a festival administrator may select any entry 845 by a point-and-click method of using the mouse on his/her personal computer. The system displays the components of an entry FIG. 11, such as entry form 1105, judging forms 1121, judging status, press kit 1103, video media 1145, and correspondence file 1113. A festival judge may also access entries for the purposes of recording judgments 1125. Using the web interface, entries can be routed to multiple judges 1207 whereupon they are able to view a copy of the filmmaker's project online, simultaneously, thus avoiding the hassle of waiting for other judges to finish before starting their reviewing process. Additionally, as a means of processing information for individual entries, festival judges can input comment and ratings for each film that can subsequently be tracked and tabulated. The festival can then generate selection reports for entries based upon satisfaction of criteria. When a final decision has been reached, notification of acceptance or rejection may be processed as a batch by the system, and would appear instantly in the filmmakers' status pages as shown in FIG. 5. Other fully automated reporting includes, but is not limited to, breakdown of entries according to different screening formats, number of countries represented in the competition, number of films submitted by men, women, or minorities, number of films that are premiers in a given territory, and average age of filmmaker. All of this reporting is performed without traditional manual tabulation or data input of any kind on the part of the festival administrator, since filmmakers have already entered all pertinent data into the service bureau's database. This same demographic information may be reported in the aggregate to generate international statistics on international film festival submissions, which have never been effectively collected due to the decentralized, analog process of entering festivals.

The preferred embodiment of the invention uses the same hierarchical structures established within the selections process 703—"crates and cartons" and "judges and juries"—to facilitate scheduling 629 of "theaters and shows" and "staffs and workers." Though these various objects are presented to the user within a similar relational interface and may be likewise manipulated as shown in FIG. 8, the attributes that govern their functionality and behavior are vastly different from a system "back-end" point of view.

Theaters are object representations of actual screening venues that will be used during a film festival. Shows are object representations of actual screening events that will be presented to an audience during a film festival, and are necessarily assigned to a theater. A screening may be assigned to a show but not to a theater. A festival programmer may create these objects of theaters and shows and assign custom attributes to them by way of a form. Informational attributes of theaters may include name, description, theater capacity, and venue address information. Theaters may also be created with certain limiters to describe the projection facility, such as exhibition formats for both picture and sound, since not all theaters are able to facilitate all media and all formats. Informational attributes for shows may include name and description. Shows also have the option of limiters for nationality, original language, and genre to assist programmers in grouping like screenings. This hierarchical, object-oriented, electronic scheduling system for festival screenings has clear advantages over traditional methods such as the use of index cards on corkboard, or the use of paper and pencil. It also alleviates the current problem of having to tabulate each film by shuffling through all the entry forms on hard copy and calculating the dates, times, venue of films, and the cumulative length of programs.

For example, in scheduling shows it is necessary for a festival programmer to repeatedly re-calculate the cumulative running times of each event. In the present invention, these cumulative run times are tabulated "on the fly" as screenings are moved into a show. Additionally, programmers may specify as part of a show's attributes: the start time of a show; the total targeted run time; any likely delay of the start time; the number and length of intermissions; and the minutes of "turnaround" time between each film. The system considers these custom attributes in making all tabulations, the product of which may be viewed and printed in calendar form or gantt chart.

As with all other parts of the festival submission system, contextual messaging is integrated into the scheduling subcomponent, such that a festival programmer may notify all participating filmmakers via a batch process of their project's exact screening dates, times, and locations. These notifications constitute yet another message type in the messaging database and would arrive instantly on the filmmaker status page FIG. 5 under the given festival 503. Via traditional international mail courier this same notification process often takes as much as ten days and is considered to be a less certain method of communication. This means of data processing the information and using a computerized means of communicating the information from the service bureau's preprogrammed database will also alleviate the need for festivals to manually fill out international customs labels, express mailing tags, shipping manifests and insurance forms for return trafficking of film prints and master screening copies to filmmakers.

As the human resources of judges and juries may be assigned to crates and cartons, so may staffs and workers be assigned to theaters and shows, and in all other ways manipulated similar to the preferred embodiment shown in FIG. 9. A staff is a collection of workers; a worker is defined by a profile. Examples of informational worker attributes are name, address, and telephone contacts, e-mail address, and system user ID. A worker may be assigned directly to a theater or a show, or may be assigned as part of a staff to a theater or a show. This object-oriented means of staffing events is an improvement over traditional text lists and paper calendar.

The preferred embodiment of the invention uses the same hierarchical structures established as with "crates and cartons" and "judges and juries" and as with "theaters and shows" and "staffs and workers" to facilitate press outreach 631, using "pressboxes and programs" and "media and reporters." In accordance with the preferred embodiment, these components may be manipulated similar to those shown in FIG. 8 and FIG. 9, although, once again, the discreet functionality is best described by the attributes that govern the behavior of these objects, rather than by the user interface.

A pressbox is a collection of programs, made accessible to selected international reporters via a password, which is created and administered by a festival press liaison. Informational attributes of a pressbox may include name, description, and hyperlinks to a festival's publicity material on its home Internet site. A program is a curated series of previews for the press, including filmmaker press kits and video media, which may, in the preferred embodiment, be edited or modified for this use. A preview may be assigned to a program, but not directly to a press box. The informational attributes of a program may include name and description. The limiting attributes of a program may include total presentation time, original language, nationality, and genre of preview.

A medium is a collection of reporters; reporters are defined by a profile. Examples of media are print, broadcast, cable, and internet. A medium is attributed with a name and a description. A reporter is attributed with contact information such as a worker, including a professional affiliation such as a network or a publication, and a service bureau user ID. This new means of reporters being able to log on to the Internet and view press materials and film previews for a particular festival via the service bureau's central server is an improvement over the traditional and costly means of dubbing festival previews and copying press kits for mailing to news outlets.

More generally, using the present invention, film festival offices are no longer tied to a geographical location. These offices will rather exist in cyberspace, and be accessible via password to administrators, international judges, filmmakers, and the press from anywhere in the world that an Internet connection exists. The service bureau backs up all information, which is distributed and outsourced on the Internet, so that festival offices are no longer in danger of losing records to fire or flood, or to local database crashes as may occur from time to time. According to the present embodiment, film festivals are also alleviated of the burden of cashing checks and handling credit cards from thousands of individual filmmakers, reducing transaction costs with a single electronic funds transfer from the service bureau, representing all fees collected on behalf of the festival.

What is claimed is:

1. A film festival submission processing method, comprising the steps of:

a) providing at least one computer connected to a global computer network having a preprogrammed database for storage of film information;

b) inputting film information by a plurality of filmmakers into the database;

c) inputting film information for one or more film festivals into the database;

d) sorting said film information into a plurality of fields;

wherein the filmmakers submit the film information necessary for entering one or more film festival into said database, such that the film festivals selected by the filmmaker can access the film information from said database via the global computer network.

2. The film festival submission processing method according to claim 1, said film information further comprises of:

a) a film production date;

b) a film production location;

c) an original language of the film and languages and formats of translations;

d) a genre;

e) a running time;

f) a production budget;

g) an international premiere and screening history;

h) a breakdown of international distribution agreements, by territory;

i) a plurality of shooting formats, exhibition formats, and preview formats;

such that film festival organizer can access and filter individual films in a uniform format based on information submitted by different filmmakers.

3. The film festival submission processing method according to claim 1, said film information further comprises of:

a) a film production date;

b) a film production location;

c) a running time;

d) a production budget;

e) a plurality of shooting formats, exhibition formats, and preview formats;

f) prose synopses of varying lengths;

g) a list of principal cast and principal crew;

h) an indication and certification of student status;

i) a pair of demographic profiles regarding the director and writer of a film;

j) a plurality of available press kit materials k) a plurality of contact information including executive producer(s); producers(s), director(s), publicist(s), shipper(s), and distributor(s);

such that film festival organizer can access and filter individual films in a uniform format based on information submitted by different filmmakers.

4. The film festival submission processing method according to claim 1, comprising the additional steps of:

a) inputting visual images of a film into the preprogrammed database;

b) inputting audio data of the film into the preprogrammed database;

c) sorting the visual images and the audio data;

such that more than one user can access the visual images and the audio data of the film at the same time.

5. The film festival submission processing method according to claim 1, and said preprogrammed database further includes film festival requirements, said film festival requirements further comprises of:

a) one or more film festival dates;

b) one or more film festival entry deadlines;

c) one or more film festival entry fees d) one or more film festival exhibition formats;

such that the filmmaker can access the film festival requirements in a uniform format.

6. The film festival submission processing method according to claim 5, and said preprogrammed database further includes film festival requirements, said film festival requirements further comprises of:

a) a plurality of requirements for form, genre, and niche communities;

b) a plurality of qualifying requirements as completion date, and place of origin;

c) a list of screening formats for preview and exhibition;

d) a list of languages and translation formats for preview and exhibition;

e) one or more methods of entry and methods of payment;

f) one or more categories of entry, each fully sub-detailed with the above listed information; and g) a statement of terms and agreements for entry into each of the film festivals.

7. The film festival submission and processing method according to claim 6, further comprises the steps of:

a) calculating the total number of film entries;

b) calculating the cumulative running time of the film entries;

such that a festival judge may obtain a total number of films to be judged and a total number of running time remaining to evaluate a remaining workload of the judge.

8. The film festival submission and processing method according to claim 1, said film information further comprises of:

a) a running time information of the film, b) sorting the films according to the running time information;

such that a film festival organizer can calculate a cumulative running time of the individual films based on information submitted by the different filmmakers to schedule films.

9. The film festival submission and processing method according to claim 1, comprising the additional steps of:

a) sending contextual messages by the film festival to the film makers with film information in the preprogrammed database simultaneously, said contextual messages comprises of:

i. one or more screening dates of the film;

ii. one or more screening times of the film;

iii. one or more screening locations of the film;

such that film festival can disseminate the contextual messages information to the film makers semi-automatically and instantly.

10. A film festival submission processing method, comprising the steps of:

a) providing at least one computer connected to a global computer network having a preprogrammed database for storage of film information;

b) inputting film information by a plurality of filmmakers into the database;

c) inputting film information by one or more film festivals into the database;

d) sorting said film information into a plurality of fields;

wherein the film festivals submit the film information necessary for managing one or more film festivals, such that one or more users can access the film information from said database via the global computer network simultaneously.

11. The film festival submission processing method of claim 10, said preprogrammed database further comprises of a plurality of object-oriented crates, each said crate comprising of:

a) one or more fields;

b) one or more object-oriented cartons, each said carton comprising of:

1) one or more fields;

2) one or more filmmaker information entries;

such that the user may organize and retrieve the film information according to one or more fields set by the user.

12. The film festival submission processing method of claim 11, said crates being fields set by the user, said fields being one or more of the following:

a) a name;

b) a description;

c) a category of entry, said category being comprised of one or more film information entries;

such that the user may organize and retrieve the film information according to a one or more fields set by the user.

13. The film festival submission processing method of claim 11, said cartons being fields set by the user, said fields being one or more of the following:

a) a theater name;

b) a theater description;

c) a theater capacity;

d) a theater address;

e) a list of projection facility limitations;

such that the user may organize and retrieve the film information according to a one or more fields set by the user.

14. The film festival submission processing method of claim 11, said cartons being fields set by the user, said fields being one or more of the following:

a) a worker name;
b) one or more addresses;
c) one or more telephone contacts;
d) one or more e-mail addresses;
e) a system user identity;

such that the film festival organizer may organize and retrieve the staff information according a list of preset fields.

15. The film festival submission processing method of claim 10, said preprogrammed database further comprises of one or more judging criteria, wherein one or more judges of the film festival have access to retrieve the film information according to a list of preset fields, and provide a plurality of judging results based on a list of preset criteria by the film festival organizers, such that the judging results are collected in the database.

* * * * *